United States Patent
Deguchi et al.

(10) Patent No.: US 7,879,489 B2
(45) Date of Patent: Feb. 1, 2011

(54) NON-AQUEOUS ELECTROLYTE SECONDARY BATTERY

(75) Inventors: Masaki Deguchi, Hirakata (JP); Tooru Matsui, Fujiidera (JP); Hiroshi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 936 days.

(21) Appl. No.: 11/327,406

(22) Filed: Jan. 9, 2006

(65) Prior Publication Data

US 2006/0166091 A1 Jul. 27, 2006

(30) Foreign Application Priority Data

Jan. 26, 2005 (JP) ............... 2005-018068

(51) Int. Cl.
- H01M 4/40 (2006.01)
- H01M 4/52 (2006.01)
- H01M 4/525 (2006.01)
- H01M 10/056 (2006.01)

(52) U.S. Cl. ............... 429/199; 429/326; 429/330; 429/331; 429/338

(58) Field of Classification Search ............... 429/199, 429/231.1, 233, 200, 326, 330, 331, 338
See application file for complete search history.

(56) References Cited

U.S. PATENT DOCUMENTS

| | | | |
|---|---|---|---|
| 5,783,333 A * | 7/1998 | Mayer | 429/223 |
| 6,682,856 B1 | 1/2004 | Watanabe et al. | |
| 2004/0166406 A1 | 8/2004 | Higuchi et al. | |
| 2004/0197667 A1 | 10/2004 | Noh et al. | |
| 2005/0106470 A1 * | 5/2005 | Yoon et al. | 429/324 |

FOREIGN PATENT DOCUMENTS

| | | | |
|---|---|---|---|
| JP | 05-242891 | | 9/1993 |
| JP | 10059725 A | * | 3/1998 |
| JP | 11016566 A | * | 1/1999 |
| JP | 2000340230 A | * | 12/2000 |
| JP | 2003-132950 A | | 5/2003 |
| JP | 2004-139963 A | | 5/2004 |
| KR | 2002-0020699 A | | 3/2002 |
| KR | 2003-0010425 A | | 2/2003 |

OTHER PUBLICATIONS

Chinese Office Action issued in Chinese Patent Application No. CN 2006100069322 dated on Apr. 18, 2008.

* cited by examiner

*Primary Examiner*—Gregg Cantelmo
(74) *Attorney, Agent, or Firm*—McDermott Will & Emery LLP

(57) ABSTRACT

To provide a high-capacity non-aqueous electrolyte secondary battery that exhibits satisfactory charge/discharge cycle characteristics even in a high temperature environment. The battery has: a positive electrode including a nickel-containing lithium composite oxide; a negative electrode capable of charging and discharging; a separator interposed between the positive and negative electrodes; and a non-aqueous electrolyte containing a non-aqueous solvent and a solute dissolved therein. The non-aqueous electrolyte contains a fluorine atom-containing aromatic compound. The nickel-containing lithium composite oxide is represented by, for example, $LiNi_xM_{1-x-y}L_yO_2$ where element M is at least one selected from the group consisting of Co and Mn; element L is at least one selected from the group consisting of Al, Sr, Y, Zr, Ta, Mg, Ti, Zn, B, Ca, Cr, Si, Ga, Sn, P, V, Sb, Nb, Mo, W and Fe; and x and y satisfy $0.1 \leq x \leq 1$ and $0 \leq y \leq 0.1$.

5 Claims, 1 Drawing Sheet

NON-AQUEOUS ELECTROLYTE SECONDARY BATTERY

FIELD OF THE INVENTION

The present invention relates to a non-aqueous electrolyte secondary battery, and more particularly to an improvement of a non-aqueous electrolyte contained in the non-aqueous electrolyte secondary battery.

BACKGROUND OF THE INVENTION

Secondary batteries containing a non-aqueous electrolyte (non-aqueous electrolyte secondary batteries), particularly lithium ion secondary batteries having a high voltage and a high energy density are vigorously studied in recent years. Most of the currently available lithium secondary batteries contain, as a positive electrode active material, $LiCoO_2$ that exhibits a high charge/discharge voltage. As the non-aqueous electrolyte, a non-aqueous solvent dissolving a solute therein is typically used. Usually, the non-aqueous solvent includes a cyclic carbonic acid ester, non-cyclic (linear) carbonic acid ester, cyclic carboxylic acid ester or the like, and the solute is lithium hexafluorophosphate ($LiPF_6$), lithium tetrafluoroborate ($LiBF_4$) or the like.

Demand for higher capacity non-aqueous electrolyte secondary batteries is strong, and significant research and development effort has been placed on higher capacity positive electrode active materials that can replace $LiCoO_2$. Particularly, nickel-containing lithium composite oxides composed mainly of nickel (e.g., $LiNiO_2$) are studied intensively, and some have already gone into actual use.

High reliability and longer life of non-aqueous electrolyte secondary batteries are also in strong demand. Batteries containing $LiNiO_2$, however, usually have lower cycle characteristics and lower thermal safety than those containing $LiCoO_2$. As such, batteries containing $LiNiO_2$ are not dominant in the market.

Under the circumstances, improvement of nickel-containing lithium composite oxides is being made actively. Japanese Laid-Open Patent Publication No. Hei 5-242891, for example, proposes $Li_aM_bNi_cO_dO_e$, where element M is at least one selected from the group consisting of Al, Mn, Sn, In, Fe, V, Cu, Mg, Ti, Zn and Mo, $0<a<1.3$, $0.02 \leq b \leq 0.5$, $0.02 \leq d/c+d \leq 0.9$, $1.8<e<2.2$, and $b+c+d=1$. It is disclosed that the crystal structure of this active material is unlikely to change so that a high capacity can be achieved and the thermal stability can be improved.

Attempts are also made to add various additives to positive electrode active materials, negative electrode active materials and non-aqueous electrolytes. Japanese Laid-Open Patent Publications Nos. 2003-132950 and 2004-139963, for example, propose to add a fluorine atom-containing aromatic compound to a non-aqueous electrolyte. The object of Japanese Laid-Open Patent Publication No. 2003-132950 is to improve charge/discharge cycle characteristics. It is disclosed that a fluorine atom-containing aromatic compound is adsorbed on or reacted with the surface of a negative electrode so as to form a film, whereby the side reaction between the non-aqueous electrolyte and the negative electrode active material is inhibited. Japanese Laid-Open Patent Publication No. 2004-139963 discloses to use a fluorine atom-containing aromatic compound so as to reduce the amount of gas generated during continuous charging.

As described above, although improvement of nickel-containing lithium composite oxides is being made, those that can exhibit satisfactory cycle characteristics have not been achieved yet. The mere addition of a fluorine atom-containing aromatic compound to a non-aqueous electrolyte does not sufficiently improve cycle characteristics, either. It has been acknowledged that the side reaction between a non-aqueous electrolyte and a positive electrode active material becomes intense particularly in a high temperature environment, resulting in highly degraded cycle characteristics.

Japanese Laid-Open Patent Publication No. 2003-132950 is intended to inhibit the side reaction between a non-aqueous electrolyte and a negative electrode active material, and therefore it does not provide any effective proposal to inhibit the side reaction between a non-aqueous electrolyte and a positive electrode active material during the repetition of charge and discharge at high temperatures.

Likewise, Japanese Laid-Open Patent Publication No. 2004-139963 is intended to reduce the amount of gas generated during continuous charging (static trickle charge) for batteries containing a typical positive electrode active material, namely, $LiCoO_2$. Accordingly, it does not provide any effective proposal to inhibit the side reaction between a non-aqueous electrolyte and a positive electrode active material during the repetition of dynamic charge and discharge at high temperatures.

SUMMARY OF THE INVENTION

In view of the above, the present invention has been accomplished and provides a high capacity non-aqueous electrolyte secondary battery comprising a nickel-containing lithium composite oxide as a positive electrode active material that can exhibit satisfactory charge/discharge cycle characteristics even in a high temperature environment.

The present invention relates to a non-aqueous electrolyte secondary battery comprising: a positive electrode comprising a nickel-containing lithium composite oxide as a positive electrode active material; a negative electrode capable of charging and discharging; a separator interposed between the positive electrode and the negative electrode; and a non-aqueous electrolyte comprising a non-aqueous solvent and a solute dissolved in the non-aqueous solvent, wherein the non-aqueous electrolyte contains a fluorine atom-containing aromatic compound.

The nickel-containing lithium composite oxide is represented by a general formula (1): $LiNi_xM_{1-x-y}L_yO_2$. Preferably, element M is at least one selected from the group consisting of Co and Mn, element L is at least one selected from the group consisting of Al, Sr, Y, Zr, Ta, Mg, Ti, Zn, B, Ca, Cr, Si, Ga, Sn, P, V, Sb, Nb, Mo, W and Fe, and x and y satisfy $0.1 \leq x \leq 1$ and $0 \leq y \leq 0.1$, respectively. Herein, $0.1 \leq x+y \leq 1$.

The fluorine atom-containing aromatic compound is preferably represented by a general formula (2):

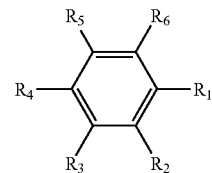

In the chemical formula (2), $R_1, R_2, R_3, R_4, R_5,$ and $R_6$ each independently represent a fluorine atom or hydrogen atom, and at least one of $R_1, R_2, R_3, R_4, R_5,$ and $R_6$ is a fluorine atom.

The amount of the fluorine atom-containing aromatic compound contained in the non-aqueous electrolyte is preferably 1 to 30 parts by weight per 100 parts by weight of the non-aqueous solvent.

Preferably, the non-aqueous electrolyte further contains at least one selected from the group consisting of vinylene carbonate and vinyl ethylene carbonate.

The present inventors conducted extensive studies and found that the fluorine atom-containing aromatic compound works effectively particularly on a positive electrode active material comprising a nickel-containing lithium composite oxide, which significantly inhibits the side reaction between the non-aqueous electrolyte and the positive electrode active material. The reason therefor can be explained as follows.

By incorporating Ni in the crystal structure of the positive electrode active material to form a solid solution, a metal oxide NiO is produced on the surface of the positive electrode active material. Because NiO is a basic oxide, the electron density on oxygen atom of NiO is high. The aromatic ring in the fluorine atom-containing aromatic compound, on the other hand, has a positive quadrupole moment due to strong electron withdrawing ability of fluorine, and the electron density on the aromatic ring is low. The fluorine atom-containing aromatic compound in the non-aqueous electrolyte is thus attracted to oxygen atom of NiO and adsorbed on the surface of the positive electrode active material to form a film. This film inhibits the side reaction between the non-aqueous electrolyte and the positive electrode active material even in a high temperature environment, resulting in improved cycle characteristics.

According to the present invention, even when a nickel-containing lithium composite oxide is used as the positive electrode active material to achieve a high capacity battery, the side reaction between the non-aqueous electrolyte and the positive electrode active material in a high temperature environment is inhibited, and the degradation of cycle characteristics can be avoided. Therefore, a non-aqueous electrolyte secondary battery having excellent characteristics can be obtained.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
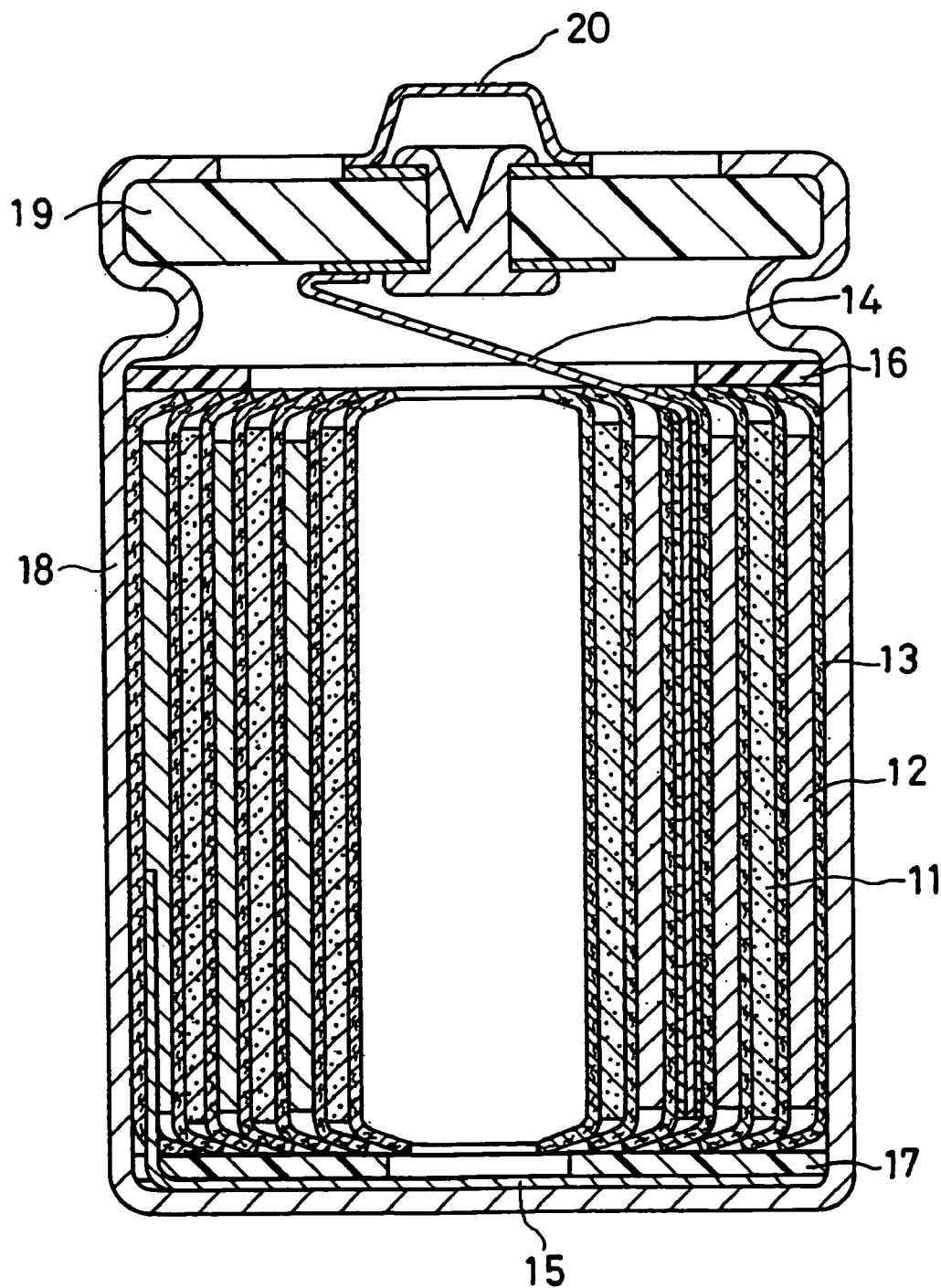
FIG. 1 is a schematic vertical cross sectional view of a cylindrical non-aqueous electrolyte secondary battery.

The non-aqueous electrolyte secondary battery of the present invention comprises a positive electrode comprising a nickel-containing lithium composite oxide as a positive electrode active material. The use of a nickel-containing lithium composite oxide provides a higher capacity battery with lower cost than the use of $LiCoO_2$. The use of a nickel-containing lithium composite oxide alone, however, cannot provide a battery having satisfactory cycle characteristics, although the single use thereof can provide a high capacity battery. In view of the above, in the present invention, a fluorine atom-containing aromatic compound is added to the non-aqueous electrolyte.

The nickel-containing lithium composite oxide is preferably represented by a general formula (1): $LiNi_xM_{1-x-y}L_yO_2$ From the view point of stabilizing the crystal structure and achieving excellent battery performance, the element M is preferably at least one selected from the group consisting of Co and Mn. The element L is preferably at least one selected from the group consisting of Al, Sr, Y, Zr, Ta, Mg, Ti, Zn, B, Ca, Cr, Si, Ga, Sn, P, V, Sb, Nb, Mo, W and Fe. The element M has the function to stabilize the crystal structure without significantly impairing the capacity, whereas the element L has the function to stabilize the crystal structure as well as to increase the electron donating ability of NiO on the surface of the positive electrode active material. The positive electrode active material may be used singly or in any combination of two or more.

Among the element L, particularly preferred are Al, Sr, Y, Zr and Ta because metal oxides produced from these elements (e.g., $Al_2O_3$ and SrO) have a remarkable effect in increasing the electron donating ability of NiO on the surface of the positive electrode active material, so that a protection film of good quality can be formed on the positive electrode surface. Accordingly, in order to achieve particularly excellent cycle characteristics, the element L is preferably at least one selected from the group consisting of Al, Sr, Y, Zr and Ta.

From the view point of obtaining the effect of the element M and maintaining a high capacity, x in the general formula (1) preferably satisfies $0.1 \leq x \leq 1$, more preferably $0.3 \leq x \leq 0.9$, and particularly preferably $0.7 \leq x \leq 0.9$.

The addition of the element L is not essential in the present invention, however, from the view point of obtaining the effect of the element L and maintaining a high capacity, y in the general formula (1) preferably satisfies $0 \leq y \leq 0.1$, more preferably $0.02 \leq y \leq 0.08$, and particularly preferably $0.02 \leq y \leq 0.06$. If y exceeds 0.1, the electron donating ability of NiO will be excessive, slightly degrading high temperature cycle characteristics.

The non-aqueous electrolyte secondary battery of the present invention comprises a negative electrode capable of charging and discharging. The negative electrode capable of charging and discharging comprises, as a negative electrode active material, a material capable of absorbing and desorbing lithium, a lithium metal or the like. Examples of the material capable of absorbing and desorbing lithium include a metal, a carbon material, oxide, nitride, a tin compound and silicide. Examples of the metal include a single metal, an alloy and metal fiber. Examples of the carbon material include graphite, non-graphitizable carbon (hard carbon), carbon black and carbon fiber. Examples of the graphite include natural graphite (e.g., flake graphite) and artificial graphite. Examples of the carbon black include acetylene black, ketjen black, channel black, furnace black, lamp black and thermal black. The negative electrode active material may be used singly or in any combination of two or more.

The positive electrode and the negative electrode contain, as the essential component, the positive and negative electrode active materials described above, respectively. Optionally, they may further contain a binder, a conductive material, a thickener, etc. Examples of the binder include polyethylene, polypropylene, polytetrafluoroethylene (PTFE), polyvinylidene fluoride (PVDF), tetrafluoroethylenehexafluoropropylene copolymer (FEP), and vinylidene fluoride-hexafluoropropylene copolymer. Examples of the conductive material include graphite, carbon black, carbon fiber, and metal fiber.

A positive electrode can be produced as follows. For example, a positive electrode material mixture comprising a positive electrode active material and the optional component(s) is mixed with a liquid component to prepare a positive electrode material mixture slurry. The obtained slurry is applied onto a positive electrode current collector, followed by drying.

Similarly, a negative electrode can be produced as follows. For example, a negative electrode material mixture comprising a negative electrode active material and the optional component(s) is mixed with a liquid component to prepare a negative electrode material mixture slurry. The obtained slurry is applied onto a negative electrode current collector, followed by drying.

The positive electrode current collector can be a sheet or foil made of stainless steel, aluminum, titanium or the like. The negative electrode current collector can be a sheet or foil made of stainless steel, nickel, copper or the like. The current collectors preferably have, but not limited to, a thickness of 1 µm to 500 µm.

A non-aqueous electrolyte secondary battery of the present invention further comprises a non-aqueous electrolyte comprising a non-aqueous solvent and a solute dissolved in the non-aqueous solvent. The non-aqueous electrolyte contains a fluorine atom-containing aromatic compound. The concentration of the solute in the non-aqueous electrolyte is not specifically limited, but preferably 0.5 mol/L to 1.5 mol/L.

The fluorine atom-containing aromatic compound is preferably represented by a general formula (2):

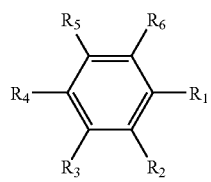

$R_1$, $R_2$, $R_3$, $R_4$, $R_5$, and $R_6$ each independently represent a fluorine atom or hydrogen atom, and at least one of $R_1$, $R_2$, $R_3$, $R_4$, $R_5$, and $R_6$ is a fluorine atom. In the compound represented by the general formula (2), a fluorine atom having high electron withdrawing ability is bonded directly to the aromatic ring, and thus the electron density of the aromatic ring tends to be low. For this reason, the aromatic ring is easily attracted to the surface of the positive electrode active material, whereby a strong film is formed on the positive electrode surface. The fluorine atom-containing aromatic compound may be used singly or in any combination of two or more.

In the general formula (2), the number of the fluorine atom bonded to the benzene ring can be any from 1 to 6, and a smaller number is preferred. When the number of the fluorine atom is large, the fluorine atom-containing aromatic compound will be excessively adsorbed on the positive electrode surface, which might inhibit charge/discharge reaction. Most preferably, the fluorine atom-containing aromatic compound is fluorobenzene (FB). This is because FB has only one fluorine atom directly bonded to the aromatic ring, and the electron density of the aromatic ring is moderately low, so that FB is easily adsorbed on the positive electrode surface, but not adsorbed excessively on the positive electrode surface.

The amount of the fluorine atom-containing aromatic compound contained in the non-aqueous electrolyte is preferably 1 to 30 parts by weight per 100 parts by weight of the non-aqueous solvent, more preferably 5 to 20 parts by weight. When the amount of the fluorine atom-containing aromatic compound is less than 1 part by weight, the ability thereof to form a film on the positive electrode surface will be low. Conversely, when the amount exceeds 30 parts by weight, the resulting film will be too thick, which might inhibit charge/discharge reaction.

Examples of the non-aqueous solvent include a cyclic carbonic acid ester, a non-cyclic carbonic acid ester, and a cyclic carboxylic acid ester. Examples of the cyclic carbonic acid ester include propylene carbonate (PC) and ethylene carbonate (EC). Examples of the non-cyclic carbonic acid ester include diethyl carbonate (DEC), ethyl methyl carbonate (EMC) and dimethyl carbonate (DMC). Examples of the cyclic carboxylic acid ester include γ-butyrolactone (GBL) and γ-valerolactone (GVL). The non-aqueous solvent may be used singly or in any combination of two or more.

Examples of the solute dissolved in the non-aqueous solvent include $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lithium lower aliphatic carboxylate, LiCl, LiBr, LiI, chloloboran lithium, borates and imides. Examples of the borate include bis(1,2-benzenediolate(2-)-O,O')lithium borate, bis (2,3-naphthalenediolate(2-)-O,O')lithium borate, bis(2,2'-biphenyldiolate(2-)-O,O')lithium borate and bis(5-fluoro-2-olate-1-benzenesulfonic acid-O,O')lithium borate. Examples of the imide include bis-trifluoromethane sulfonyl imide lithium $((CF_3SO_2)_2NLi)$, trifluoromethane sulfonyl nonafluorobutane sulfonyl imide lithium $(LiN(CF_3SO_2)(C_4F_9SO_2))$ and bis-pentafluoroethane sulfonyl imide lithium $((C_2F_5SO_2)_2NLi)$. The solute may be used singly or in any combination of two or more.

The non-aqueous electrolyte may further contain a cyclic carbonic acid ester having at least one carbon-carbon unsaturated bond. Examples of the cyclic carbonic acid ester having at least one carbon-carbon unsaturated bond include vinylene carbonate (VC), 3-methyl vinylene carbonate, 3,4-dimethyl vinylene carbonate, 3-ethyl vinylene carbonate, 3,4-diethyl vinylene carbonate, 3-propyl vinylene carbonate, 3,4-dipropyl vinylene carbonate, 3-phenyl vinylene carbonate, 3,4-diphenyl vinylene carbonate, vinyl ethylene carbonate (VEC) and divinyl ethylene carbonate. They may be used singly or in any combination of two or more. They can also form a film on the electrode surface and has the effect of inhibiting the side reaction.

Among the cyclic carbonic acid esters having at least one carbon-carbon unsaturated bond listed above, particularly, at least one selected from the group consisting of vinylene carbonate (VC) and vinyl ethylene carbonate (VEC) is preferably used. It is known that VC and VEC are decomposed on the negative electrode surface to form a film. It is assumed that they also form a thin film on the positive electrode surface. When the positive electrode comprises a nickel-containing lithium composite oxide, a mixed film (copolymer) composed of units derived from the fluorine atom-containing aromatic compound and units derived from VC and/or VEC is formed on the positive electrode surface. This mixed film functions to significantly improve the contact between the positive electrode and the separator.

The film derived from the fluorine atom-containing aromatic compound is strong and rigid, and therefore unlikely to be separated from the positive electrode surface. On the other hand, it has poor flexibility, and thus the contact between the positive electrode and the separator tends to be insufficient. As for the mixed film (copolymer) containing a unit derived from VC and/or VEC, it has a low glass transition temperature, and the elasticity is low over a temperature range from low to high temperatures, in other words, it has flexibility. Accordingly, the contact between the positive electrode and the separator is improved. This prevents, when the separator shuts down in a battery exposed to overcharge or high temperatures, the separator from contracting, and thus internal short-circuit between the positive and negative electrodes can be prevented. As used herein, the "shut down" means a phenomenon that the pores of a separator close when the battery having the separator is exposed to a high temperature.

The amount of the cyclic carbonic acid ester having at least one carbon-carbon unsaturated bond contained in the non-aqueous electrolyte is preferably 0.5 to 10 parts by weight per 100 parts by weight of the non-aqueous solvent, more preferably 0.5 to 7 parts by weight. When the amount of the cyclic carbonic acid ester having at least one carbon-carbon unsaturated bond is less than 0.5 parts by weight, the effect of improving the contact between the positive electrode and the separator will be small. Conversely, when the amount exceeds 10 parts by weight, the resulting mixed film will be too thick, which might inhibit charge/discharge reaction.

The non-aqueous solvent may further contain a small amount of additive that can be decomposed on an electrode during overcharge to form a film which deactivates the battery. The additive is preferably a benzene derivative comprising a phenyl group and a cyclic group adjacent to the phenyl group. As the cyclic group, phenyl group, cyclic ether group, cyclic ester group, cycloalkyl group or phenoxy group is preferred. Specific examples of the benzene derivative include cyclohexylbenzene, biphenyl and diphenyl ether. They may be used singly or in any combination of two or more. The content of the benzene derivative is preferably not greater than 10% by volume of the entire non-aqueous solvent.

The separator interposed between the positive electrode and the negative electrode can be a microporous thin film, woven fabric or non-woven fabric having a high ion permeability, a certain mechanical strength and insulation capability. The separator is preferably made of polyolefin such as polypropylene or polyethylene, and it may be made of glass fiber. Particularly, a microporous thin film made of polyolefin having shut-down function is preferably used. The thickness of the separator is usually 10 μm to 300 μm.

The present invention will be described in detail below with reference to examples, but it should be understood that the present invention is not limited thereto.

Example 1

(i) Preparation of Non-Aqueous Electrolyte

In a solvent mixture of ethylene carbonate (EC) and ethyl methyl carbonate (EMC) at a volume ratio of 1:4 was dissolved $LiPF_6$ at a concentration of 1.0 mol/L. To 100 parts by weight of the obtained solution was added 5 parts by weight of fluorobenzene (FB). Thereby, a non-aqueous electrolyte was prepared.

(ii) Production of Positive Electrode

A positive electrode material mixture was prepared by mixing 85 parts by weight of $LiNi_{0.8}Co_{0.2}O_2$ powder (positive electrode active material), 10 parts by weight of acetylene black (conductive material) and 5 parts by weight of polyvinylidene fluoride (binder). The positive electrode material mixture was dispersed in dehydrated N-methyl-2-pyrrolidone (NMP) to prepare a positive electrode material mixture slurry. The obtained slurry was applied onto both surfaces of a positive electrode current collector made of an aluminum foil, followed by drying and rolling. Thereby, a positive electrode was produced.

(iii) Production of Negative Electrode

A negative electrode material mixture was prepared by mixing 75 parts by weight of artificial graphite (negative electrode active material), 20 parts by weight of acetylene black (conductive material) and 5 parts by weight of polyvinylidene fluoride (binder). The negative electrode material mixture was dispersed in dehydrated NMP to prepare a negative electrode material mixture slurry. The obtained slurry was applied onto both surfaces of a negative electrode current collector made of a copper foil, followed by drying and rolling. Thereby, a negative electrode was produced.

(iv) Production of Cylindrical Battery

A cylindrical battery having a vertical cross section as schematically illustrated in FIG. 1 was produced in the following procedure.

A positive electrode 11 and a negative electrode 12 was spirally wound with a separator 13 interposed therebetween to produce an electrode assembly. The electrode assembly was housed in a battery case 18 made of iron plated with nickel. An end of a positive electrode lead 14 made of aluminum was connected to the positive electrode 11. The other end was connected to the underside of a sealing plate 19 electrically connected to a positive electrode terminal 20. Similarly, an end of a negative electrode lead 15 made of nickel was connected to the negative electrode 12. The other end was connected to the bottom of the battery case 18. On the top of the electrode assembly was placed an insulating plate 16. On the bottom was placed an insulating plate 17. Then, a non-aqueous electrolyte was injected into the battery case 18, after which the opening of the battery case 18 was sealed with the sealing plate 19.

(v) Evaluation of Battery

The obtained battery was repeatedly cycled (i.e., charged and discharged) at 45° C. The rate of the discharge capacity at the 500th cycle was calculated in percentage with the discharge capacity at the third cycle taken as 100%, which was referred to as capacity retention rate. The results are shown in Table 1.

In the above charge/discharge cycle, constant current/voltage charge at a maximum current of 1050 mA with a limit voltage of 4.2 V were performed for 2.5 hours. After an interval of 10 minutes, constant current discharge at a discharge current of 1500 mA with an end-of-discharge voltage of 3.0 V was performed. Then, another interval of 10 minutes was taken. This cycle was repeated.

Comparative Example 1

A battery was produced in the same manner as in EXAMPLE 1 except that FB was not added to the non-aqueous electrolyte. Then, the produced battery was evaluated in the same manner as in EXAMPLE 1. The result is shown in Table 1.

Comparative Example 2

A battery was produced in the same manner as in EXAMPLE 1 except that lithium cobalt oxide ($LiCoO_2$) was used as the positive electrode active material. Then, the produced battery was evaluated in the same manner as in EXAMPLE 1. The result is shown in Table 1.

Comparative Example 3

A battery was produced in the same manner as in EXAMPLE 1 except that the non-aqueous electrolyte was changed to the one used in COMPARATIVE EXAMPLE 1, and that the positive electrode active material was changed to the one used in COMPARATIVE EXAMPLE 2. Then, the produced battery was evaluated in the same manner as in EXAMPLE 1. The result is shown in Table 1.

Comparative Examples 4 to 8

Batteries were produced in the same manner as in EXAMPLE 1 except that the non-aqueous electrolyte was changed to the one used in COMPARATIVE EXAMPLE 1 and that the positive electrode active material was changed to nickel-containing lithium composite oxides having compositions shown in Table 1. Then, the produced batteries were evaluated in the same manner as in EXAMPLE 1. The results are shown in Table 1.

TABLE 1

|  | Positive electrode active material | Fluorobenzene (part by weight) | Capacity retention rate (%) |
|---|---|---|---|
| Ex. 1 | $LiNi_{0.8}Co_{0.2}O_2$ | 5 | 86.5 |
| Comp. Ex. 1 | $LiNi_{0.8}Co_{0.2}O_2$ | 0 | 38.3 |
| Comp. Ex. 2 | $LiCoO_2$ | 5 | 40.1 |
| Comp. Ex. 3 | $LiCoO_2$ | 0 | 39.5 |
| Comp. Ex. 4 | $LiNi_{0.8}Co_{0.15}Al_{0.05}O_2$ | 0 | 38.0 |
| Comp. Ex. 5 | $LiNi_{0.8}Co_{0.15}Sr_{0.05}O_2$ | 0 | 38.2 |
| Comp. Ex. 6 | $LiNi_{0.8}Co_{0.15}Y_{0.05}O_2$ | 0 | 37.1 |
| Comp. Ex. 7 | $LiNi_{0.8}Co_{0.15}Zr_{0.05}O_2$ | 0 | 36.7 |
| Comp. Ex. 8 | $LiNi_{0.8}Co_{0.15}Ta_{0.05}O_2$ | 0 | 36.8 |

Table 1 indicates that a battery having excellent cycle characteristics can be obtained only when a nickel-containing lithium composite oxide as the positive electrode active material and a non-aqueous electrolyte containing FB are used together. Presumably, this is because FB having a low electron density contained in the non-aqueous electrolyte was adsorbed on the surface of the positive electrode active material containing NiO having a high electron withdrawing ability, whereby a protection film was formed on the positive electrode surface.

Example 2

Batteries were produced in the same manner as in EXAMPLE 1 except that nickel-containing lithium composite oxides having compositions shown in Table 2 were used as the positive electrode active material. Then, the produced batteries were evaluated in the same manner as in EXAMPLE 1. The results are shown in Table 2.

TABLE 2

|  | Positive electrode active material | Fluorobenzene (part by weight) | Capacity retention rate (%) |
|---|---|---|---|
| Ex. 2 | $LiNi_{0.005}Co_{0.995}O_2$ | 5 | 80.2 |
|  | $LiNi_{0.05}Co_{0.95}O_2$ | 5 | 80.9 |
|  | $LiNi_{0.1}Co_{0.9}O_2$ | 5 | 83.0 |
|  | $LiNi_{0.3}Co_{0.7}O_2$ | 5 | 85.1 |
|  | $LiNi_{0.5}Co_{0.5}O_2$ | 5 | 85.3 |
|  | $LiNi_{0.7}Co_{0.3}O_2$ | 5 | 86.0 |
|  | $LiNi_{0.8}Co_{0.2}O_2$ | 5 | 86.5 |
|  | $LiNi_{0.9}Co_{0.1}O_2$ | 5 | 86.1 |

TABLE 2-continued

| Positive electrode active material | Fluorobenzene (part by weight) | Capacity retention rate (%) |
|---|---|---|
| $LiNiO_2$ | 5 | 81.3 |
| $LiNi_{0.8}Co_{0.15}Al_{0.05}O_2$ | 5 | 88.2 |
| $LiNi_{0.8}Co_{0.15}Sr_{0.05}O_2$ | 5 | 87.9 |
| $LiNi_{0.8}Co_{0.15}Y_{0.05}O_2$ | 5 | 87.5 |
| $LiNi_{0.8}Co_{0.15}Zr_{0.05}O_2$ | 5 | 87.7 |
| $LiNi_{0.8}Co_{0.15}Ta_{0.05}O_2$ | 5 | 88.0 |
| $LiNi_{0.8}Co_{0.15}Mg_{0.05}O_2$ | 5 | 85.2 |
| $LiNi_{0.8}Co_{0.15}Ti_{0.05}O_2$ | 5 | 85.9 |
| $LiNi_{0.8}Co_{0.15}Zn_{0.05}O_2$ | 5 | 86.1 |
| $LiNi_{0.8}Co_{0.15}B_{0.05}O_2$ | 5 | 86.1 |
| $LiNi_{0.8}Co_{0.15}Ca_{0.05}O_2$ | 5 | 84.6 |
| $LiNi_{0.8}Co_{0.15}Cr_{0.05}O_2$ | 5 | 85.5 |
| $LiNi_{0.8}Co_{0.15}Si_{0.05}O_2$ | 5 | 84.4 |
| $LiNi_{0.8}Co_{0.15}Ga_{0.05}O_2$ | 5 | 86.0 |
| $LiNi_{0.8}Co_{0.15}Sn_{0.05}O_2$ | 5 | 85.8 |
| $LiNi_{0.8}Co_{0.15}P_{0.05}O_2$ | 5 | 84.7 |
| $LiNi_{0.8}Co_{0.15}V_{0.05}O_2$ | 5 | 84.5 |
| $LiNi_{0.8}Co_{0.15}Sb_{0.05}O_2$ | 5 | 84.8 |
| $LiNi_{0.8}Co_{0.15}Nb_{0.05}O_2$ | 5 | 85.3 |
| $LiNi_{0.8}Co_{0.15}Mo_{0.05}O_2$ | 5 | 84.5 |
| $LiNi_{0.8}Co_{0.15}W_{0.05}O_2$ | 5 | 85.0 |
| $LiNi_{0.8}Co_{0.15}Fe_{0.05}O_2$ | 5 | 85.0 |
| $LiNi_{0.5}Mn_{0.5}O_2$ | 5 | 85.2 |
| $LiNi_{0.5}Mn_{0.4}Co_{0.1}O_2$ | 5 | 85.3 |
| $LiNi_{0.34}Mn_{0.33}Co_{0.33}O_2$ | 5 | 85.0 |

Table 2 shows that a battery having excellent high temperature cycle characteristics can be obtained by the combined use of a non-aqueous electrolyte containing FB and a nickel-containing lithium composite oxide represented by the general formula (1): $LiNi_xM_{1-x-y}L_yO_2$, where element M is at least one selected from the group consisting of Co and Mn; element L is at least one selected from the group consisting of Al, Sr, Y, Zr, Ta, Mg, Ti, Zn, B, Ca, Cr, Si, Ga, Sn, P, V, Sb, Nb, Mo, W and Fe; and x and y satisfy $0.1 \leq x \leq 1$ and $0 \leq y \leq 0.1$, respectively.

It also indicates that the value of x that represents the amount of Ni in the positive electrode active material is preferably $0.1 \leq x \leq 0.9$, more preferably $0.3 \leq x \leq 0.9$, and particularly preferably $0.7 \leq x \leq 0.9$.

It is also clear from Table 2 that a battery having excellent high temperature cycle characteristics can be obtained when the element L in the general formula (1) is at least one selected from the group consisting of Al, Sr, Y, Zr and Ta.

Example 3

Batteries were produced in the same manner as in EXAMPLE 1 except that compounds shown in Table 3 were used as the fluorine atom-containing aromatic compound contained in the non-aqueous electrolyte. Then, the produced batteries were evaluated in the same manner as in EXAMPLE 1. The results are shown in Table 3.

TABLE 3

|  | Fluorine atom-containing aromatic compound | Capacity retention rate(%) |
|---|---|---|
| Ex. 3 | Fluorobenzene | 86.5 |
|  | 1,2-difluorobenzene | 85.1 |
|  | 1,2,3-trifluorobenzene | 85.0 |
|  | 1,2,3,4-tetrafluorobenzene | 84.8 |
|  | Pentafluorobenzene | 84.5 |
|  | Hexafluorobenzene | 84.2 |
|  | 2-fluorotoluene | 82.7 |
|  | α,α,α,-trifluorotoluene | 80.3 |

TABLE 3-continued

| Fluorine atom-containing aromatic compound | Capacity retention rate(%) |
|---|---|
| 3-fluoro-o-xylene | 81.4 |
| Bistrifluoromethylbenzene | 80.8 |
| 2-fluorostyrene | 82.2 |
| 4-fluorostyrene | 82.9 |

As can be seen from Table 3, regardless of the type of the fluorine atom-containing aromatic compound, the combined use of a positive electrode active material comprising the nickel-containing lithium composite oxide and a non-aqueous electrolyte containing the fluorine atom-containing aromatic compound can yield a battery having excellent high temperature cycle characteristics.

Among the fluorine atom-containing aromatic compounds, particularly the batteries containing compounds represented by the general formula (2) (namely, FB, 1,2-difluorobenzene, 1,2,3-trifluorobenzene, 1,2,3,4-tetrafluorobenzene, pentafluorobenzene and hexafluorobenzene) exhibited excellent high temperature cycle characteristics. Presumably, fluorine atoms having high electron withdrawing ability were bonded directly to the aromatic ring in the above-mentioned fluorine atom-containing aromatic compounds, and thus the electron density of the aromatic ring decreased. Accordingly, the amount of the fluorine atom-containing aromatic compound attracted to and adsorbed on the surface of the positive electrode active material increased, whereby a strong film was formed.

Moreover, among the compounds represented by the general formula (2), the battery containing FB exhibited the most excellent cycle characteristics. Because only one fluorine atom was bonded directly to the aromatic ring in FB, it is surmised that the electron density of the aromatic ring did not decrease excessively so that FB was not excessively adsorbed on the positive electrode surface. Thus, charge/discharge reaction was not inhibited, and excellent cycle characteristics were achieved.

Example 4

Batteries were produced in the same manner as in EXAMPLE 1 except that the amount of FB relative to 100 parts by weight of the non-aqueous solvent was changed to those shown in Table 4 to prepare non-aqueous electrolytes. Then, the produced batteries were evaluated in the same manner as in EXAMPLE 1. The results are shown in Table 4.

TABLE 4

| | Fluorobenzene (part by weight) | Capacity retention rate (%) |
|---|---|---|
| Ex. 4 | 0.5 | 70.9 |
| | 1 | 81.9 |
| | 2 | 85.3 |
| | 5 | 86.5 |
| | 10 | 88.5 |
| | 20 | 87.4 |
| | 30 | 82.0 |
| | 40 | 71.2 |

As evident from Table 4, when the amount of FB was less than 1 part by weight per 100 parts by weight of the non-aqueous solvent, the effect of improving cycle characteristics when the amount of FB exceeded 30 parts by weight, the film formed on the positive electrode surface was too thick, inhibiting charge/discharge reaction, so that the effect of improving cycle characteristics was also small. Thus, it can be seen that the amount of the fluorine atom-containing aromatic compound is preferably 1 to 30 parts by weight per 100 parts by weight of the non-aqueous solvent, more preferably 5 to 20 parts by weight.

Example 5

Batteries were produced in the same manner as in EXAMPLE 1 except that the fluorine atom-containing aromatic compound containing in the non-aqueous electrolyte was changed to those listed in Table 5, and that vinylene carbonate (VC) and/or vinyl ethylene carbonate (VEC) were further added to the non-aqueous electrolyte in an amount shown in Table 5 relative to 100 parts by weight of the non-aqueous solvent. Then, the produced batteries were evaluated in the same manner as in EXAMPLE 1. The results are shown in Table 5.

TABLE 5

| | VC* | VEC* | Fluorine atom-containing aromatic compound | Capacity retention rate (%) | Contraction time (min.) |
|---|---|---|---|---|---|
| Ex. 5 | 0 | 0 | Fluorobenzene | 86.5 | 22.5 |
| | 0 | 0 | 1,2-difluorobenzene | 85.1 | 22.3 |
| | 0 | 0 | Hexafluorobenzene | 84.2 | 22.2 |
| | 0 | 0 | 2-fluorotoluene | 82.7 | 23.0 |
| | 0 | 0 | 4-fluorostyrene | 82.9 | 21.9 |
| | 1 | 0 | Fluorobenzene | 86.8 | 50.5 |
| | 1 | 0 | 1,2-difluorobenzene | 85.3 | 50.7 |
| | 1 | 0 | Hexafluorobenzene | 84.5 | 50.0 |
| | 1 | 0 | 2-fluorotoluene | 82.9 | 49.5 |
| | 1 | 0 | 4-fluorostyrene | 83.3 | 49.6 |
| | 0 | 1 | Fluorobenzene | 87.9 | 51.9 |
| | 0 | 1 | Hexafluorobenzene | 86.0 | 50.8 |
| | 1 | 1 | Fluorobenzene | 88.1 | 52.2 |
| | 1 | 1 | Hexafluorobenzene | 86.4 | 51.4 |
| Comp. Ex. 9 | 2 | 0 | No | 23.3 | 21.0 |
| | 0 | 2 | No | 82.8 | 21.0 |
| | 2 | 2 | No | 83.1 | 21.2 |

*Note that VC and VEC are expressed in part by weight.

The batteries produced in EXAMPLE 5 were subjected to thermal resistant test at 150° C. to determine the contraction time of the separators. The test was conducted as follows.

Each battery was subjected to constant current/voltage charge at a maximum current of 1050 mA with a limit voltage of 4.2 V for 2.5 hours. The charged battery was heated from 20° C. to 150° C. at a constant rate of 5° C./min. After the battery reached 150° C., the battery was held at that temperature for 3 hours. When the separator shuts down and the separator starts to contract, the negative electrode and the positive electrode come in contact with each other (short-circuit), and thus the battery voltage suddenly drops from about 4.2 V to about 0 V. Using this mechanism, the voltage of the battery held at 150° C. was closely monitored, and the time from the beginning of the test until the battery voltage suddenly dropped was measured, which was referred to as contraction time. The results are shown in Table 5.

Comparative Example 9

Batteries were produced in the same manner as in EXAMPLE 1 except for using non-aqueous electrolytes containing only vinylene carbonate (VC) and/or vinyl ethylene carbonate (VEC) in an amount shown in Table 5 relative to 100 parts by weight of the non-aqueous solvent (i.e., non-aqueous electrolytes without the fluorine atom-containing aromatic compound). Then, the produced batteries were evaluated in the same manner as in EXAMPLE 5. The results are shown in Table 5.

Table 5 indicates that the combined use of the fluorine atom-containing aromatic compound with VC and/or VEC further improves high temperature cycle life characteristics as well as significantly enhances the thermal resistance of the battery. The reason for the significantly improved thermal resistance is presumably because a mixed film composed of units derived from the fluorine atom-containing aromatic compound and units derived from VC and/or VEC was formed on the surface of the positive electrode active material comprising the nickel-containing lithium composite oxide. More specifically, the mixed film significantly improved the contact between the positive electrode and the separator, reducing the contraction of the separator during the shutdown of the separator, preventing the contact (short-circuit) between the positive and negative electrodes, whereby safety was improved.

The present invention is applicable to any non-aqueous electrolyte secondary battery comprising a nickel-containing lithium composite oxide as the positive electrode active material. Particularly, the present invention is useful where it is necessary to provide a non-aqueous electrolyte secondary battery having excellent high temperature cycle life characteristics. The non-aqueous electrolyte secondary battery of the present invention is useful as power sources for small portable appliances.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising:
a positive electrode comprising a nickel-containing lithium composite oxide as a positive electrode active material;
a negative electrode capable of charging and discharging;
a separator interposed between said positive electrode and said negative electrode; and
a non-aqueous electrolyte comprising a non-aqueous solvent and a solute dissolved in said non-aqueous solvent,
wherein said non-aqueous electrolyte contains fluorobenzene and vinyl ethylene carbonate, and
said nickel-containing lithium composite oxide is represented by a general formula (1):

$LiNi_xM_{1-x-y}L_yO_2$, where element M is at least one selected from the group consisting of Co and Mn; element L is at least one selected from the group consisting of Al, Sr, Y, Zr, Ta, Mg, Ti, Zn, B, Ca, Cr, Si, Ga, Sn, P, V, Sb, Nb, Mo, W and Fe; and x and y satisfy $0.7 \leq x \leq 0.9$ and $0 \leq y < 0.1$, respectively.

2. The non-aqueous electrolyte secondary battery in accordance with claim 1, wherein y satisfies $0 < y < 0.1$ and said element L is at least one selected from the group consisting of Al, Sr, Y, Zr and Ta.

3. The non-aqueous electrolyte secondary battery in accordance with claim 1, wherein the amount of said fluorobenzene contained in said non-aqueous electrolyte is 1 to 30 parts by weight per 100 parts by weight of said non-aqueous solvent.

4. The non-aqueous electrolyte secondary battery in accordance with claim 1, wherein said non-aqueous electrolyte further contains vinylene carbonate.

5. The non-aqueous electrolyte secondary battery in accordance with claim 1, wherein y satisfies $0 < y < 0.1$ and said element L is at least one selected from the group consisting of Y and Ta.

* * * * *